(12) United States Patent
Chou et al.

(10) Patent No.: US 9,407,176 B2
(45) Date of Patent: Aug. 2, 2016

(54) INTEGRATED SYSTEM OF CIRCUITS FOR SERIAL FAN STRUCTURE

(71) Applicant: ASIA VITAL COMPONENTS CO., LTD., New Taipei (TW)

(72) Inventors: Chu-Hsien Chou, New Taipei (TW); Yu-An Lin, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 299 days.

(21) Appl. No.: 14/034,564

(22) Filed: Sep. 24, 2013

(65) Prior Publication Data

US 2015/0084569 A1    Mar. 26, 2015

(51) Int. Cl.
*H02P 23/00* (2016.01)
*H02K 9/00* (2006.01)
*F01D 13/00* (2006.01)
*F04D 19/00* (2006.01)
*F04B 35/04* (2006.01)
*H02P 5/74* (2006.01)
*F04D 25/06* (2006.01)

(52) U.S. Cl.
CPC ............... *H02P 5/74* (2013.01); *F04D 19/007* (2013.01); *F04D 25/0613* (2013.01); *F04D 25/0633* (2013.01); *F04D 25/0693* (2013.01)

(58) Field of Classification Search
CPC ... H02P 5/74; F04D 25/0633; F04D 25/0693; F04D 25/0613; F04D 19/007
USPC ................... 318/494; 415/68, 220; 417/423.1; 310/64
See application file for complete search history.

(56) References Cited

U.S. PATENT DOCUMENTS

| | | | | |
|---|---|---|---|---|
| 6,443,056 | B1 * | 9/2002 | Kiefer ...................... | B60P 3/20 62/329 |
| 6,630,759 | B2 * | 10/2003 | Yamaguchi ............ | H02K 7/063 310/234 |
| 2008/0260517 | A1 * | 10/2008 | Hayashigaito ........ | F04D 19/007 415/68 |
| 2012/0039730 | A1 * | 2/2012 | Shen ..................... | F04D 29/083 417/423.7 |
| 2012/0126644 | A1 * | 5/2012 | Wu ......................... | H02K 5/12 310/64 |
| 2014/0354117 | A1 * | 12/2014 | Ishihara ................. | H02K 5/225 310/67 R |

* cited by examiner

*Primary Examiner* — Eduardo Colon Santana
*Assistant Examiner* — Gabriel Agared

(57) ABSTRACT

An integrated system of circuits for serial fan structure includes a first and a second fan connected back to back. A first driving unit and a first control unit for the first fan and a second driving unit and a second control unit for the second fan are sequentially electrically connected to a circuit board in the second fan. Further, a first coil assembly of the first fan and a second coil assemble of the second fan are also electrically connected to the circuit board in the second fan; and some low-use-rate electronic circuits are included in a common circuit unit of the first and the second fan. Therefore, the serial fan structure can save one circuit board and some low-use-rate electronic circuits from the first fan to achieve the purpose of reducing the manufacturing cost of the serial fan structure.

18 Claims, 6 Drawing Sheets

INTEGRATED SYSTEM OF CIRCUITS FOR SERIAL FAN STRUCTURE

FIELD OF THE INVENTION

The present invention relates to a system of circuits for a serial fan structure, and more particularly, to an integrated system of circuits for a serial fan structure that effectively reduces the serial fan structure's manufacturing cost.

BACKGROUND OF THE INVENTION

Currently, various electronic products are quickly developed to have largely reduced weight and dimensions but high operating performance, frequency and speed. As a result, more and more heat is produced by the electronic products during operation thereof to even have adverse influence on the products' reliability and service life. Therefore, heat dissipation has become a very important issue for all kinds of electronic products. Among others, cooling fan is frequently used as a heat dissipation device. And, to obtain enhanced heat dissipation performance, a plurality of serially connected fans can be used to produce airflow of increased volume and pressure.

Generally, two fans are serially connected to form a serial fan structure. Each of the two fans includes, for example, a fan wheel, a frame, a stator, a Hall sensor, a micro control unit (MCU) and a circuit board; and the Hall sensor, the MCU and a plurality of other electronic circuits, such as a buck circuit, a voltage regulation circuit and a pulse width modulation (PWM) circuit, are plugged into the circuit board. In addition, a coil assembly on the stator for each fan is always electrically connected to the circuit board of the same fan. To achieve the purpose of cost control, most fan manufacturers would generally use low-specification parts for low-power serial fan structure.

However, the use of low-specification parts to achieve cost control in manufacturing the conventional serial fan structure causes another problem. In each fan, there are parts having low use rate, such as the buck circuit, the voltage regulation circuit and the PWM circuit. Since these low-use-rate parts provide some necessary functions, they should and could not be omitted from the fan. Without omitting the low-use-rate parts, the use of low-specification parts can only achieve very limited fan manufacturing cost reduction. Therefore, the fan manufacturers have to work out other effective ways for further reducing the fan manufacturing cost.

It is therefore tried by the inventor to develop an improved integrated system of circuits for serial fan structure, in order to overcome the above-mentioned problems and disadvantages as found with the conventional serial fan structure

SUMMARY OF THE INVENTION

A primary object of the present invention is to provide an integrated system of circuits for serial fan structure that effectively reduces the manufacturing cost of a serial fan structure.

Another object of the present invention is to provide an integrated system of circuits for serial fan structure that effectively saves some low-use-rate electronic circuits from one fan of a serial fan structure.

To achieve the above and other objects, the integrated system of circuits for serial fan structure according to a preferred embodiment of the present invention includes a first fan and a second fan. The first fan includes a first frame, a first fan wheel, a first stator, a first driving unit and a first control unit. The first frame internally defines a first receiving space and has a first shaft base centered in the first receiving space for the first fan wheel to rotatably mount thereon. The first stator is externally fitted on around the first shaft base, and includes a first silicon steel plate assembly and a first coil assembly wound on around the first silicon steel plate assembly. The second fan is connected to the first fan back to back and includes a second frame, a second fan wheel, a second stator, a second driving unit, a circuit unit and a second control unit. The second frame internally defines a second receiving space and has a second shaft base centered in the second receiving space. The second fan wheel is rotatably mounted on the second shaft base. The second stator is externally fitted on around the second shaft base, and includes a second silicon steel plate assembly, a second coil assembly wound on around the second silicon steel plate assembly, and a circuit board connected to the first and the second coil assembly. The circuit board is located on one side of the second shaft base facing toward the second fan wheel. The first and the second driving unit, the first and the second control unit, and the circuit unit are sequentially electrically connected to one side of the circuit board. With the above arrangements, the integrated system of circuits for serial fan structure according to the present invention can effectively save one circuit board and one circuit unit, which includes some low-use-rate electronic circuits, from one of the fans forming the serial fan structure and accordingly, effectively reduce the manufacturing cost thereof.

According to another preferred embodiment of the present invention, the integrated system of circuits for serial fan structure includes a first fan and a second fan. The first fan includes a first frame, a first fan wheel, a first stator, a first driving unit, a first sensor unit and a first control unit. The first frame internally defines a first receiving space and has a first shaft base centered in the first receiving space for the first fan wheel to rotatably mount thereon. The first stator is externally fitted on around the first shaft base, and includes a first silicon steel plate assembly, a first coil assembly wound on around the first silicon steel plate assembly, and a first circuit board. The first circuit board is electrically connected to the first coil assembly, and is located on one side of the first shaft base facing toward the first fan wheel. The first sensor unit is electrically connected to one side of the first circuit board. The second fan is connected to the first fan back to back and includes a second frame, a second fan wheel, a second stator, a second driving unit, a circuit unit, a second sensor unit and a second control unit. The second frame internally defines a second receiving space and has a second shaft base centered in the second receiving space. The second fan wheel is rotatably mounted on the second shaft base. The second stator is externally fitted on around the second shaft base, and includes a second silicon steel plate assembly, a second coil assembly wound on around the second silicon steel plate assembly, and a second circuit board. The second circuit board is electrically connected to the second coil assembly, and is located on one side of the second shaft base facing toward the second fan wheel. The first and the second driving unit, the first and the second control unit, and the circuit unit are sequentially electrically connected to one side of the second circuit board; and the first sensor unit and the first coil assembly are also electrically connected to one side of the second circuit board. With the above arrangements, the integrated system of circuits for serial fan structure according to the present invention includes one common circuit unit of the first and the second fan, so that the low-use-rate electronic circuits can be saved from one of the fans forming the serial fan structure to effectively reduce the manufacturing cost thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
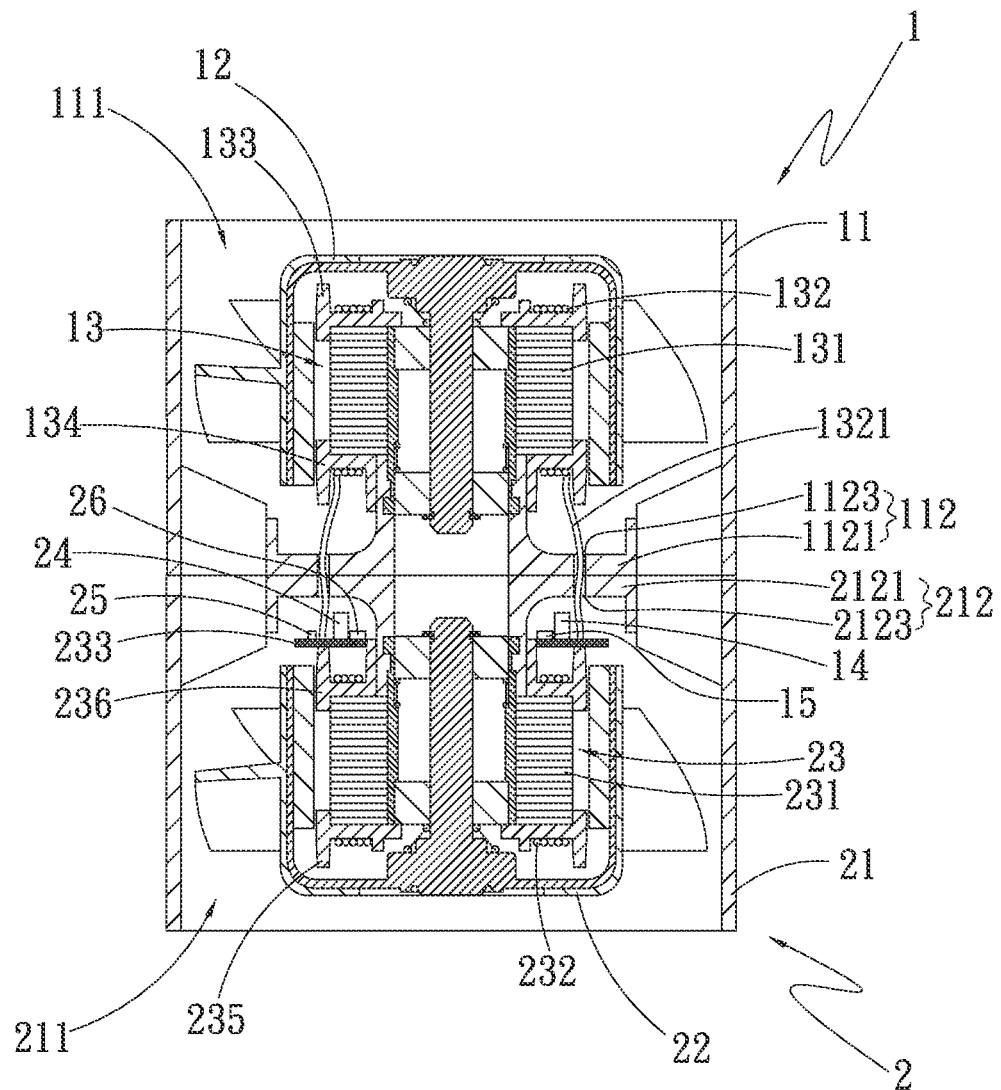
FIG. 1 is an assembled sectional view showing a first preferred embodiment of the present invention.

The present invention will now be described with some preferred embodiments thereof and with reference to the accompanying drawings. For the purpose of easy to understand, elements that are the same in the preferred embodiments are denoted by the same reference numerals.

Please refer to FIG. 1, which is an assembled sectional view showing an integrated system of circuits for serial fan structure according to a first preferred embodiment of the present invention. As shown, the integrated system of circuits for serial fan structure in the first preferred embodiment includes a first fan 1 and a second fan 2, which receive their respective commutation signal through three-phase sensorless driving. And, three-phase sensorless driving may further include some different driving manners, such as terminal voltage estimation, back electromotive force estimation and the like.

The first fan 1 includes a first frame 11, a first fan wheel 12, a first stator 13, a first driving unit 14, and a first control unit 15. The first frame 11 internally defines a first receiving space 111, in which a first shaft base 112 is centered. The first stator 13 is externally fitted on around the first shaft base 112, and the first fan wheel 12 is rotatably mounted on the first shaft base 112 to locate in the first receiving space 111 and enclose the first stator 23 therein.

The first stator 13 includes a first silicon steel plate assembly 131, a first coil assembly 132, a first upper insulation rack 133, and a first lower insulation rack 134. The first silicon steel plate assembly 131 is mounted to between the first upper insulation rack 133 and the first lower insulation rack 134, and the first coil assembly 132 is wound on around the first silicon steel plate assembly 131, the first upper insulation rack 133 and the first lower insulation rack 134. The first control unit 15 illustrated in the first preferred embodiment is a micro control unit (MCU). However, it is understood the first control unit 15 as an MCU is only illustrative and not intended to limit the present invention in any way.

The second fan 2 and the first fan 1 are serially connected back to back. As can be seen in FIG. 1, the second fan 2 includes a second frame 21, a second fan wheel 22, a second stator 23, a second driving unit 24, a circuit unit 25, and a second control unit 26. The second frame 21 internally defines a second receiving space 211, in which a second shaft base 212 is centered. The second stator 23 is externally fitted on around the second shaft base 212, and the second fan wheel 22 is rotatably mounted on the second shaft base 212 to locate in the second receiving space 211 and enclose the second stator 23 therein.

In the illustrated first preferred embodiment, the first and the second fan 1, 2 are serially connected back to back via engagement of a plurality of engaging sections (not shown) provided on a back of the first frame 11, such as protrusions or recesses, with a plurality of retaining sections (not shown) correspondingly provided on a back of the second frame 21, such as recesses or protrusions, so as to construct a serial fan structure. However, it is understood, in practical implementation of the present invention, the first and the second fan 1, 2 can also be serially connected back to back by other means without being limited to the manner illustrated in the first preferred embodiment. For instance, the first frame 11 and the second frame 21 may be otherwise connected back to back by gluing their backs to each other.

The second stator 23 includes a second silicon steel plate assembly 231, a second coil assembly 232, a second upper insulation rack 235, a second lower insulation rack 236, and a circuit board 233. The second silicon steel plate assembly 231 is mounted to between the second upper insulation rack 235 and the second lower insulation rack 236, and the second coil assembly 232 is wound on around the second silicon steel plate assembly 231, the second upper insulation rack 235 and the second lower insulation rack 236. The circuit board 233 is located on one side of the second shaft base 212 facing toward the second fan wheel 22, and is electrically connected to both of the second coil assembly 232 and the first coil assembly 132. The first and the second driving unit 14, 24, the first and the second control unit 15, 26, and the circuit unit 25 are sequentially electrically connected to one side of the circuit board 233.

When the first and the second fan 1, 2 are switched on, the first and the second control unit 15, 26 on the circuit board 233 respectively control and actuate the first and the second driving unit 14, 24, which are electrically connected to the circuit board 233 and accordingly, to the first and second control unit 15, 26, respectively, so that the first driving unit 14 connected to the first coil assembly 132 receives a signal transmitted by the first control unit 15 to drive the first fan 1 to operate, and the second driving unit 24 connected to the second coil assembly 232 receives a signal transmitted by the second control unit 26 to drive the second fan 2 to operate. Meanwhile, the circuit unit 25 on the circuit board 233 is a common circuit unit of the first and the second fan 1, 2. Therefore, by making the circuit unit 25 a common circuit unit of the first and the second fan 1, 2 and saving one circuit board from the first fan 1, the present invention effectively saves the material cost for one circuit board and some low-use-rate electronic circuits to thereby achieve the purpose of lowering the serial fan structure's manufacturing cost.

Figure 2:
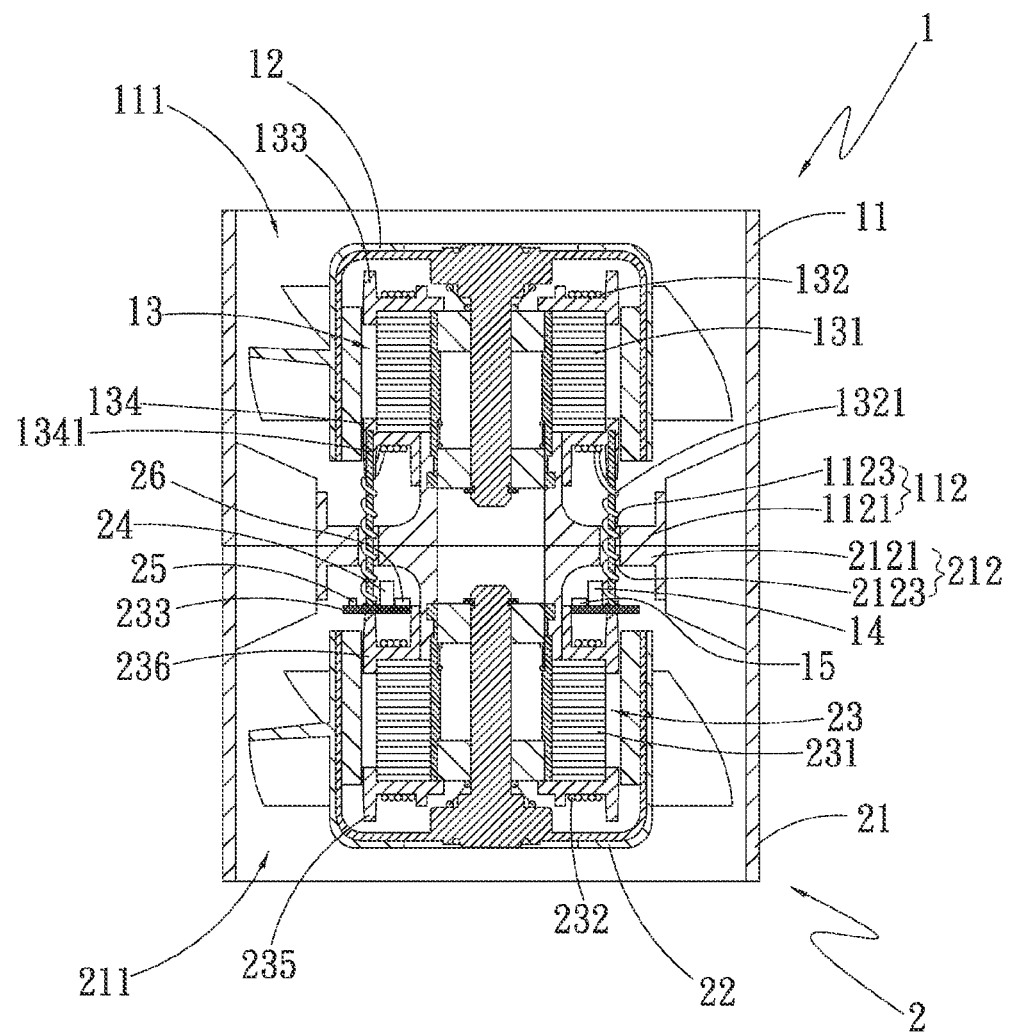
FIG. 2 is an assembled sectional view showing a first variant of the first preferred embodiment of the present invention.
Figure 3:
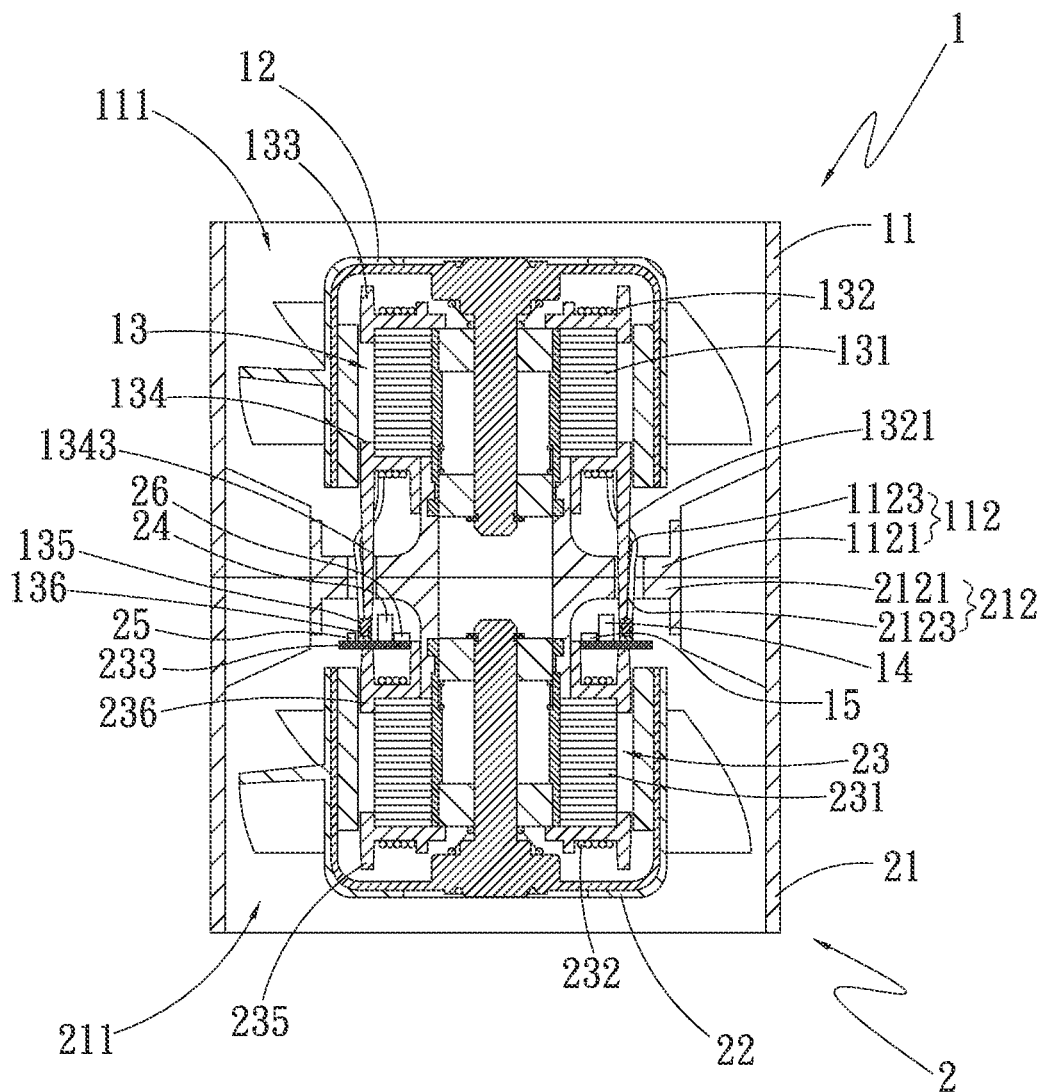
FIG. 3 is an assembled sectional view showing a second variant of the first preferred embodiment of the present invention.

The circuit unit 25 includes a plurality of electronic circuits consisting of a plurality of active components and a plurality of passive components. These electronic circuits include, for example, a buck circuit, a voltage regulation circuit, a pulse width modulation (PWM) circuit and the like. In FIG. 1, it is shown a preferred manner of electrically connecting the first coil assembly 132 of the first fan 1 to the circuit board 233 of the second fan 2 for the first preferred embodiment of the present invention, and FIGS. 2 and 3 show two variants thereof. However, it is understood the manners shown in FIGS. 1, 2 and 3 for electrically connecting the first coil assembly 132 to the circuit board 233 are only illustrative and not intended to limit the present invention in any way.

As shown in FIG. 1, the first shaft base 112 includes a first seat 1121, on which at least one first through hole 1123 is provided to axially extend through the first seat 1121, and the second shaft base 212 includes a second seat 2121 configured corresponding to the first seat 1121. On the second seat 2121, at least one second through hole 2123 is provided corresponding to the first through hole 1123 to axially extend through the second seat 2121 and communicate with the first through hole 1123. The first coil assembly 132 has at least one lead wire 1321 that is not wound around the first silicon steel plate assembly 131, the first upper insulation rack 133 and the first lower insulation rack 134 to be held in place. The lead wire 1321 is extended through a pair of two corresponding first and second through holes 1123, 2123 to electrically connect to the circuit board 233, bringing the first coil assembly 132 to electrically connect to the first driving unit 14.

FIG. 2 shows a second feasible manner of electrically connecting the first coil assembly 132 to the circuit board 233. As can be seen in FIG. 2, the second manner is generally similar to the preferred manner shown in FIG. 1, except that, in the second manner, the lead wire 1321 each is wound around one of a plurality of conducting pins 1341 backward extended from the first lower insulation rack 134. Each of the conducting pins 1341 and the lead wire 1321 wound therearound are extended through one pair of two corresponding first and second through holes 1123, 2123 to plug into the circuit board 233, so that the lead wire 1321 of the first coil assembly 132 is electrically connected to the circuit board 233 and the first driving unit 14.

FIG. 3 shows a third feasible manner of electrically connecting the first coil assembly 132 to the circuit board 233. As can be seen in FIG. 3, the third manner is generally similar to the preferred manner shown in FIG. 1, except that, in the third manner, the lead wire 1321 each is extended to connect to an end of a corresponding male connector 135. More specifically, the first lower insulation rack 134 includes a plurality of legs 1343, each of which is extended from a back of the first lower insulation rack 134 through one corresponding first through hole 1123 on the first seat 1121 of the first shaft base 112; and the male connector 135 is provided on a free end of each of the legs 1343. Each of the legs 1343 and the male connector 135 provided thereon are further extended through one corresponding second through hole 2123, so that the male connector 135 is engaged with a female connector 136 correspondingly provided on the circuit board 233, bringing the first coil assembly 132 to electrically connected to the circuit board 233 and the first driving unit 14.

With the first preferred embodiment of the present invention, only one fan of the serial fan structure, that is, the second fan 2, is provided with a circuit board 233, and the circuit unit 25 including some electronic circuits having low use rate is a common circuit unit of the first and second fans 1, 2. Therefore, one circuit board and the low-use-rate electronic circuits included in the circuit unit 25 can be saved from the other fan, i.e. the first fan 1, to effectively lower the serial fan structure's manufacturing cost.

Figure 4:
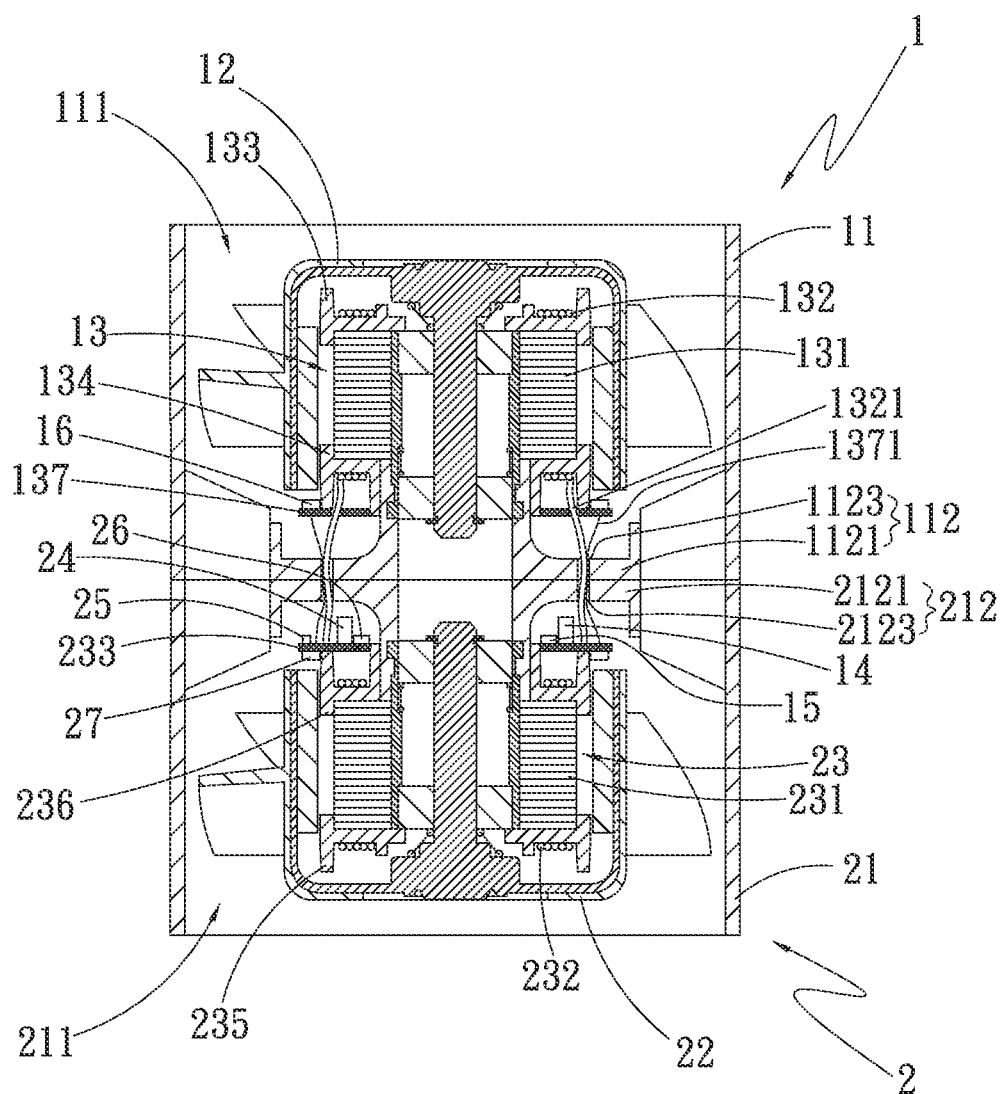
FIG. 4 is an assembled sectional view showing a second preferred embodiment of the present invention.

FIG. 4 is an assembled sectional view showing an integrated system of circuits for serial fan structure according to a second preferred embodiment of the present invention, of which the serial fan structure receives commutation signals through Hall sensors. As shown, the second preferred embodiment is generally structurally similar to the first preferred embodiment. Therefore, in the following paragraphs, only the portions of the second preferred embodiment that are different from the first preferred embodiment are described.

As can be seen in FIG. 4, in the second preferred embodiment, the first fan 1 further includes a first sensor unit 16, which can be, for example, a Hall sensor; and the first stator 13 further includes a first circuit board 137 connected to the first coil assembly 132. The first circuit board 137 is located on one side of the first shaft base 112 facing toward the first fan wheel 12, and the first sensor unit 16 is electrically connected to one side of the first circuit board 137. Moreover, the second fan 2 further includes a second sensor unit 27, which, like the first sensor unit 16, can be a Hall sensor, for example; and the second stator 23 is provided with a second circuit board 233, which is connected to the second coil assembly 232. The second circuit board 233 is identical to the circuit board 233 in the first preferred embodiment, but is referred to as the second circuit board 233 in the second preferred embodiment for the purpose of more clearly distinguishing it from the first circuit board 137. The second circuit board 233 is connected to the second coil assembly 232 and is located on one side of the second shaft base 212 facing the second fan wheel 22. The first and second driving units 14, 24, the first and second control units 15, 26, and the circuit unit 25 are sequentially electrically connected to one side of the second circuit board 233, while the first sensor unit 16 and the first coil assembly 132 are also brought to electrically connect to one side of the second circuit board 233. Further, the first coil assembly 132 is electrically connected to the first driving unit 14 on the second circuit board 233.

When the first and the second fan 1, 2 are switched on, the first and the second control unit 15, 26 on the second circuit board 233 of the second fan 2 receive, respectively, a Hall signal from the first sensor unit 16 and a Hall signal from the second sensor unit 27, and accordingly control and actuate the first and the second driving unit 14, 24, which are electrically connected to the second circuit board 233 and accordingly, to the first and second control unit 15, 26, respectively, so that the first driving unit 14 connected to the first coil assembly 132 receives a signal transmitted by the first control unit 15 to drive the first fan 1 to operate, and the second driving unit 24 connected to the second coil assembly 232 receives a signal transmitted by the second control unit 26 to drive the second fan 2 to operate. Meanwhile, the circuit unit 25 on the second circuit board 233 is a common circuit unit of the first and the second fan 1, 2. Therefore, by making the circuit unit 25 a common circuit unit of the first and the second fan 1, 2, the present invention effectively saves the material cost for the low-use-rate electronic circuits from the first fan to thereby achieve the effect of lowering the serial fan's manufacturing cost.

Figure 5:
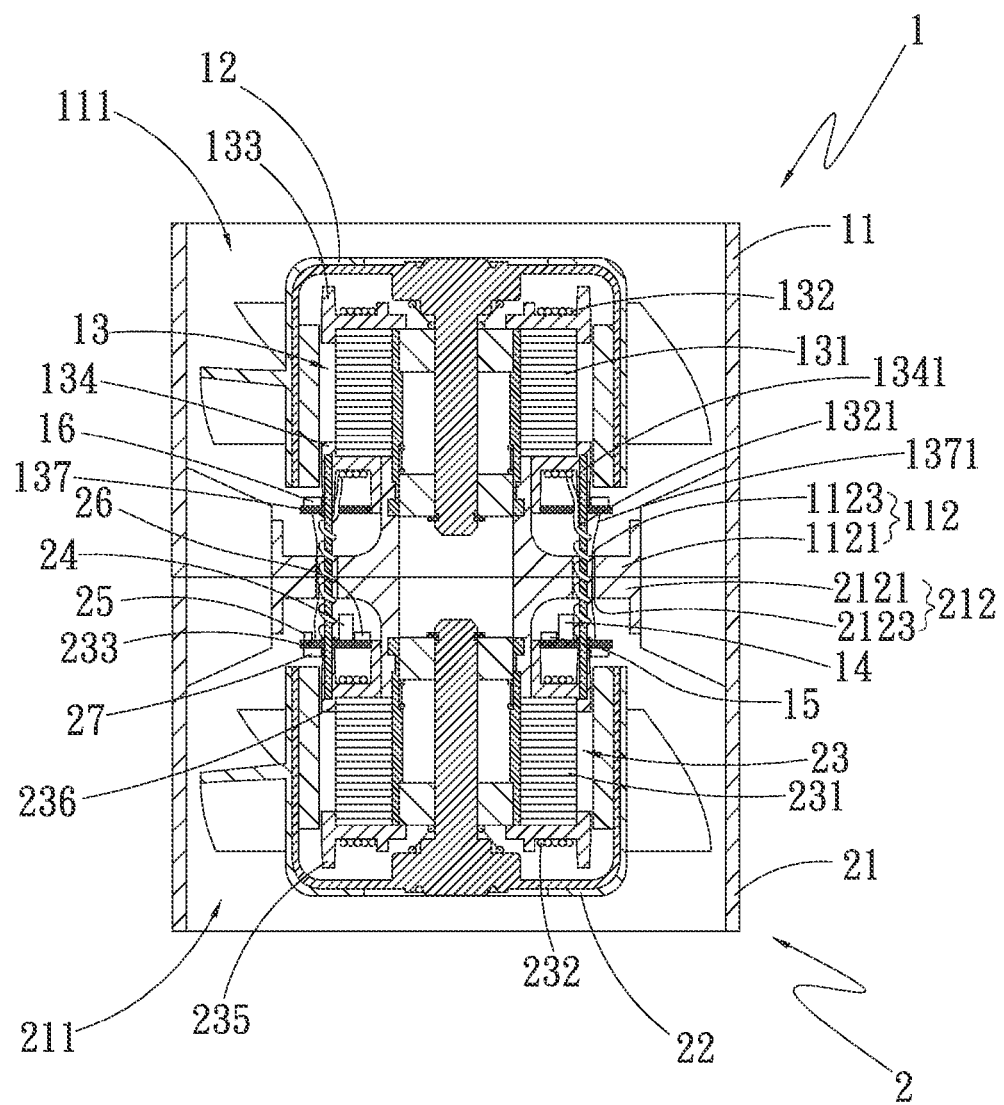
FIG. 5 is an assembled sectional view showing a first variant of the second preferred embodiment of the present invention.
Figure 6:
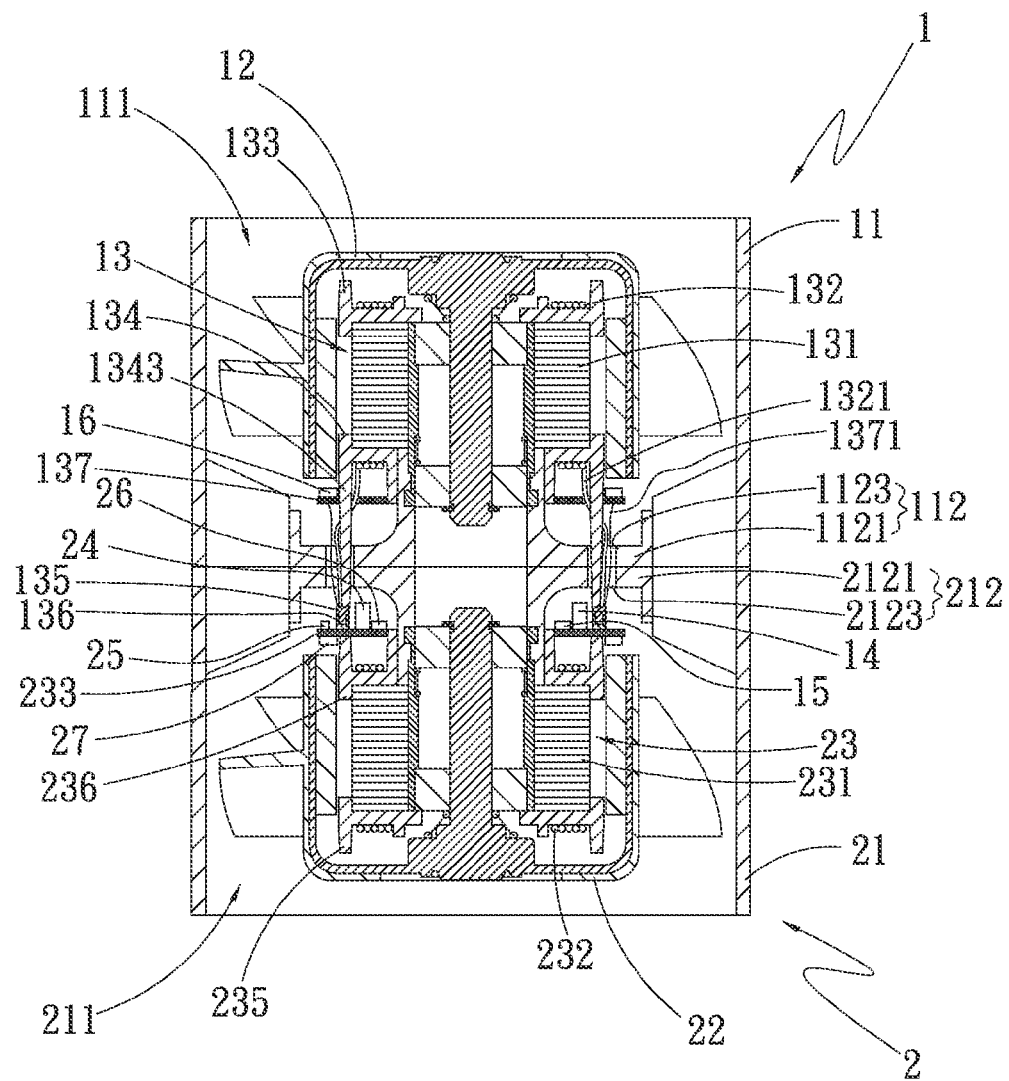
FIG. 6 is an assembled sectional view showing a second variant of the second preferred embodiment of the present invention.

Similarly, the circuit unit 25 in the second preferred embodiment includes a plurality of electronic circuits consisting of a plurality of active components and a plurality of passive components. These electronic circuits include, for example, a buck circuit, a voltage regulation circuit, a pulse width modulation (PWM) circuit and the like. In FIG. 4, it is shown a preferred manner of electrically connecting the first coil assembly 132 and the first sensor unit 16 of the first fan 1 to the second circuit board 233 of the second fan 2 for the second preferred embodiment of the present invention, and FIGS. 5 and 6 show two variants thereof. However, it is understood the manners shown in FIGS. 4, 5 and 6 for electrically connecting the first coil assembly 132 and the first sensor unit 16 to the second circuit board 233 are only illustrative and not intended to limit the present invention in any way.

As shown in FIG. 4, the first shaft base 112 includes a first seat 1121, on which at least one first through hole 1123 is provided to axially extend through the first seat 1121, and the second shaft base 212 includes a second seat 2121 configured corresponding to the first seat 1121. On the second seat 2121, at least one second through hole 2123 is provided corresponding to the first through hole 1123 to axially extend through the second seat 2121 and communicate with the first through hole 1123. The first coil assembly 132 has at least one lead wire 1321 that is not wound around the first silicon steel plate assembly 131, the first upper insulation rack 133 and the first lower insulation rack 134 to be held in place. The lead wire 1321 and a length of connection wire 1371, which is provided on the first circuit board 137 to connect with the first sensor unit 16, are extended through a pair of two corresponding first and second through holes 1123, 2123 to electrically connect to the second circuit board 233, bringing the first coil assembly 132 and the first sensor unit 16 to electrically connect to the first driving unit 14 and the first control unit 15, respectively, on the second circuit board 233.

FIG. 5 shows a second feasible manner of electrically connecting the first coil assembly 132 and the first sensor unit 16 to the second circuit board 233. As can be seen in FIG. 5, the second manner is generally similar to the preferred manner shown in FIG. 4, except that, in the second manner, the lead wire 1321 each is wound around one of a plurality of conducting pins 1341 backward extended from the first lower insulation rack 134. Each of the conducting pins 1341 and the lead wire 1321 wound therearound along with the length of connection wire 1371 are extended through one pair of two corresponding first and second through holes 1123, 2123 to plug into the second circuit board 233, so that the lead wire 1321 of the first coil assembly 132 and the connection wire 1371 are electrically connected to the first driving unit 14 and the first control unit 15 on the second circuit board 233.

FIG. 6 shows a third feasible manner of electrically connecting the first coil assembly 132 and the first sensor unit 16 to the second circuit board 233. As can be seen in FIG. 6, the third manner is generally similar to the preferred manner shown in FIG. 4, except that, in the third manner, the lead wire 1321 each along with the connection wire 1371 are extended to connect to an end of a corresponding male connector 135. More specifically, the first lower insulation rack 134 includes a plurality of legs 1343, each of which is extended from a back of the first lower insulation rack 134 through one corresponding first through hole 1123 on the first seat 1121 of the first shaft base 112; and the male connector 135 is provided on a free end of each of the legs 1343. Each of the legs 1343 and the male connector 135 provided thereon are further extended through one corresponding second through hole 2123, so that the male connector 135 is engaged with a female connector 136 correspondingly provided on the second circuit board 233, bringing the first coil assembly 132 and the first sensor 16 to, respectively, electrically connected to the first driving unit 14 and the first control unit 15 on the second circuit board 233.

With the second preferred embodiment of the present invention, the circuit unit 25 including some electronic circuits having low use rate is a common circuit unit of the first and second fans 1, 2. That is, the low-use-rate electronic circuits included in the circuit unit 25 are saved from the first circuit board 137 to effectively lower the serial fan structure's manufacturing cost.

Compared to the prior art, the present invention has the following advantages: (1) saving the low-use-rate electronic circuits from one fan of the serial fan structure to effectively achieve the purpose of cost control; and (2) saving a circuit board from one fan of the serial fan structure to effectively achieve the purpose of cost saving.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An integrated system of circuits for serial fan structure, comprising:
    a first fan including a first frame, a first fan wheel, a first stator, a first driving unit and a first control unit; the first frame internally defining a first receiving space and having a first shaft base centered in the first receiving space; the first stator being externally fitted on around the first shaft base, and including a first silicon steel plate assembly and a first coil assembly wound around the first silicon steel plate assembly; and the first fan wheel being rotatably mounted on the first shaft base; the first control unit being a micro control unit (MCU); and no circuit board being included in the first fan; and
    a second fan being connected to the first fan back to back, and including a second frame, a second fan wheel, a second stator, a second driving unit, a circuit unit and a second control unit; the second frame internally defining a second receiving space and having a second shaft base centered in the second receiving space; the second fan wheel being mounted on the second shaft base; the second stator being externally fitted on around the second shaft base, and including a second silicone steel plate assembly, a second coil assembly wound around the second silicon steel plate assembly, and a circuit board connected to the first and the second coil assembly; the circuit board being located on one side of the second shaft base facing toward the second fan wheel; the second control unit being a micro control unit (MCU); and the first and the second driving unit, the first and the second control unit, and the circuit unit being sequentially electrically connected and mounted on to one side of the circuit board of the second fan, so that the circuit board and the circuit unit on the circuit board of the second fan are a common circuit board and a common circuit unit of the first and the second fan.

2. The integrated system of circuits for serial fan structure as claimed in claim 1, wherein the first shaft base includes a first seat and is provided with at least one first through hole, which axially extends through the first seat; and wherein the second shaft base includes a second seat and is provided with at least one second through hole, which axially extends through the second seat; and the second through hole being located at a position corresponding to the first through hole to communicate with the first through hole.

3. The integrated system of circuits for serial fan structure as claimed in claim 2, wherein the first stator further includes a first upper insulation rack and a first lower insulation rack; the first silicon steel plate assembly being mounted to between the first upper and lower insulation racks, and the first coil assembly being wound on around the first silicon steel plate assembly, the first upper insulation rack and the first lower insulation rack; the first coil assembly having at least one lead wire that is not wound on around the silicon steel plate assembly and the first upper and lower insulation racks to be held in place; and the lead wire being extended through a pair of two corresponding first and second through holes to electrically connect to the circuit board.

4. The integrated system of circuits for serial fan structure as claimed in claim 2, wherein the first stator further includes a first upper insulation rack and a first lower insulation rack; the first silicon steel plate assembly being mounted to between the first upper and lower insulation racks, and the first coil assembly being wound on around the silicon steel plate assembly, the first upper insulation rack and the first lower insulation rack; the first coil assembly having at least one lead wire that is not wound on around the silicon steel plate assembly and the first upper and lower insulation racks to be held in place; the first lower insulation rack including a plurality of backward extended conducting pins, around each of which the lead wire is wound; and each of the conducting pins with the lead wire wound therearound being extended through a pair of two corresponding first and second through holes to plug into the circuit board, bringing the lead wire of the first coil assembly to electrically connected to the circuit board.

5. The integrated system of circuits for serial fan structure as claimed in claim 2, wherein the first stator further includes a first upper insulation rack and a first lower insulation rack; the first silicon steel plate assembly being mounted to between the first upper and lower insulation racks, and the first coil assembly being wound on around the silicon steel plate assembly, the first upper insulation rack and the first lower insulation rack; the first coil assembly having at least one lead wire that is not wound on around the silicon steel plate assembly and the first upper and lower insulation racks to be held in place; the first lower insulation rack including a plurality of legs, each of which is backward extended from the first lower insulation rack through one corresponding first through hole on the first seat of the first shaft base and has a male connector provided on a free end thereof; the at least one lead wire being extended to connect with the male connector on one corresponding leg, and the leg and the male connector provided thereon being further extended through one corresponding second through hole, so that the male connector is engaged with a female connector correspondingly provided on the circuit board.

6. The integrated system of circuits for serial fan structure as claimed in claim 2, wherein the circuit unit includes a plurality of electronic circuits consisting of a plurality of active components and a plurality of passive components.

7. The integrated system of circuits for serial fan structure as claimed in claim 3, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

8. The integrated system of circuits for serial fan structure as claimed in claim 4, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

9. The integrated system of circuits for serial fan structure as claimed in claim 5, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

10. An integrated system of circuits for serial fan structure, comprising:
a first fan including a first frame, a first fan wheel, a first stator, a first driving unit, a first sensor unit and a first control unit; the first frame internally defining a first receiving space and having a first shaft base centered in the first receiving space; the first stator being externally fitted on around the first shaft base, and including a first silicon steel plate assembly, a first coil assembly wound around the first silicon steel plate assembly, and a first circuit board connected to the first coil assembly; the first circuit board being located on one side of the first shaft base facing toward the first fan wheel; the first sensor unit being electrically connected to one side of the first circuit board; and the first fan wheel being rotatably mounted on the first shaft base; the first control unit being a micro control unit (MCU); and no circuit unit being positioned on the first circuit board of the first fan; and
a second fan being connected to the first fan back to back, and including a second frame, a second fan wheel, a second stator, a second driving unit, a circuit unit, a second sensor unit and a second control unit; the second frame internally defining a second receiving space and having a second shaft base centered in the second receiving space; the second fan wheel being mounted on the second shaft base; the second stator being externally fitted on around the second shaft base, and including a second silicone steel plate assembly, a second coil assembly wound around the second silicon steel plate assembly, and a second circuit board connected to the second coil assembly; the second circuit board being located on one side of the second shaft base facing toward the second fan wheel; the second control unit being a micro control unit (MCU); the first and the second driving unit, the first and the second control unit, and the circuit unit being sequentially electrically connected to one side of the second circuit board, so that the circuit unit of the second fan is a common circuit unit of the first and the second fan; and the first sensor unit and the first coil assembly also being electrically connected to one side of the second circuit board.

11. The integrated system of circuits for serial fan structure as claimed in claim 10, wherein the first shaft base includes a first seat and is provided with at least one first through hole, which axially extends through the first seat; and wherein the second shaft base includes a second seat and is provided with at least one second through hole, which axially extends through the second seat; and the second through hole being located at a position corresponding to the first through hole to communicate with the first through hole.

12. The integrated system of circuits for serial fan structure as claimed in claim 11, wherein the first stator further includes a first upper insulation rack and a first lower insulation rack; the first silicon steel plate assembly being mounted to between the first upper and lower insulation racks, and the first coil assembly being wound on around the first silicon steel plate assembly, the first upper insulation rack and the first lower insulation rack; the first coil assembly having at least one lead wire that is not wound on around the silicon steel plate assembly and the first upper and lower insulation racks to be held in place; the first circuit board including a connection wire connected to the first sensor unit; and the lead wire and the connection wire being extended through a pair of two corresponding first and second through holes to electrically connect to the second circuit board.

13. The integrated system of circuits for serial fan structure as claimed in claim 11, wherein the first stator further includes a first upper insulation rack and a first lower insulation rack; the first silicon steel plate assembly being mounted to between the first upper and lower insulation racks, and the first coil assembly being wound on around the silicon steel plate assembly, the first upper insulation rack and the first lower insulation rack; the first coil assembly having at least one lead wire that is not wound on around the silicon steel plate assembly and the first upper and lower insulation racks to be held in place; the first lower insulation rack including a plurality of backward extended conducting pins, around each of which the lead wire is wound; the first circuit board including a connection wire connected to the first sensor unit; and each of the conducting pins with the lead wire wound therearound and the connection wire being extended through a pair of two corresponding first and second through holes to plug into the second circuit board, bringing the lead wire of the first coil assembly and the connection wire to electrically connected to the second circuit board.

14. The integrated system of circuits for serial fan structure as claimed in claim 11, wherein the first stator further includes a first upper insulation rack and a first lower insulation rack; the first silicon steel plate assembly being mounted to between the first upper and lower insulation racks, and the first coil assembly being wound on around the silicon steel plate assembly, the first upper insulation rack and the first lower insulation rack; the first coil assembly having at least one lead wire that is not wound on around the silicon steel plate assembly and the first upper and lower insulation racks to be held in place; the first lower insulation rack including a plurality of legs, each of which is backward extended from the first lower insulation rack through one corresponding first through hole on the first seat of the first shaft base and has a male connector provided on a free end thereof; the first circuit board including a connection wire connected to the first sensor unit; the at least one lead wire and the connection wire being extended to connect with the male connector on one corresponding leg, and the leg and the male connector provided thereon being further extended through one corresponding second through hole, so that the male connector is engaged with a female connector correspondingly provided on the circuit board.

15. The integrated system of circuits for serial fan structure as claimed in claim 11, wherein the circuit unit includes a plurality of electronic circuits consisting of a plurality of active components and a plurality of passive components.

16. The integrated system of circuits for serial fan structure as claimed in claim 12, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

17. The integrated system of circuits for serial fan structure as claimed in claim 13, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

18. The integrated system of circuits for serial fan structure as claimed in claim 14, wherein the second stator further includes a second upper insulation rack and a second lower insulation rack; the second silicon steel plate assembly being mounted to between the second upper and lower insulation racks, and the second coil assembly being wound on around the second silicon steel plate assembly, the second upper insulation rack and the second lower insulation rack.

* * * * *